US012599057B2

(12) United States Patent
Cresswell et al.

(10) Patent No.: US 12,599,057 B2
(45) Date of Patent: Apr. 14, 2026

(54) OPTIMIZING RELATIVE PLACEMENT OF SEEDS AND FERTILIZERS

(71) Applicant: Bourgault Industries Ltd., St. Brieux (CA)

(72) Inventors: Mark Cresswell, St. Brieux (CA); Devin Lung, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 553 days.

(21) Appl. No.: 18/020,742

(22) PCT Filed: Mar. 4, 2021

(86) PCT No.: PCT/CA2021/050288
§ 371 (c)(1),
(2) Date: Feb. 10, 2023

(87) PCT Pub. No.: WO2022/032374
PCT Pub. Date: Feb. 17, 2022

(65) Prior Publication Data
US 2024/0032457 A1 Feb. 1, 2024

(30) Foreign Application Priority Data
Aug. 11, 2020 (CA) ................................ CA 3089919

(51) Int. Cl.
*A01C 7/20* (2006.01)
*A01C 5/06* (2006.01)
*A01C 7/06* (2006.01)

(52) U.S. Cl.
CPC .............. *A01C 7/203* (2013.01); *A01C 5/062* (2013.01); *A01C 5/068* (2013.01); *A01C 7/06* (2013.01)

(58) Field of Classification Search
CPC ........... A01C 7/203; A01C 7/201; A01C 7/20; A01C 7/00; A01C 5/062; A01C 5/06; A01C 5/00; A01C 5/068; A01C 5/066; A01C 7/06
See application file for complete search history.

(56) References Cited

U.S. PATENT DOCUMENTS

| | | | |
|---|---|---|---|
| 5,396,851 A | 3/1995 | Beaujot | |
| 5,609,114 A | 3/1997 | Barton | |
| 6,216,616 B1 | 4/2001 | Bourgault | |
| 7,159,523 B2 | 1/2007 | Bourgault et al. | |
| 7,261,048 B1 | 8/2007 | Hantke | |
| 8,909,436 B2 | 12/2014 | Achen et al. | |
| 2008/0308024 A1* | 12/2008 | Lung ...................... A01C 7/201 |
| | | | 111/149 |
| 2011/0282556 A1* | 11/2011 | Klenz .................... A01C 7/203 |
| | | | 701/50 |
| 2018/0338411 A1 | 11/2018 | Jagow | |

* cited by examiner

*Primary Examiner* — Christopher J. Novosad
(74) *Attorney, Agent, or Firm* — FBT Gibbons LLP

(57) ABSTRACT

A method of improving crop yields by optimizing seed depth and a separation distance between seeds and fertilizer during planting into a field surface as soil conditions change between negative field portions and positive field portions of the field surface and the transitional field portion lying between the negative and positive field portions wherein the seed depth and separation distance between seeds and fertilizer is increased in adverse soil conditions and decreased in favorable soil conditions.

12 Claims, 6 Drawing Sheets

OPTIMIZING RELATIVE PLACEMENT OF SEEDS AND FERTILIZERS

CROSS REFERENCE TO RELATED APPLICATION

This application is a national stage entry of, and claims priority to PCT/CA2021/050288, entitled "Optimizing Relative Placement of Seeds and Fertilizers," filed Mar. 4, 2021, the disclosure of which is incorporated by reference herein in its entirety and for all purposes.

FIELD OF THE INVENTION

This disclosure relates to the field of agriculture and in particular provides a method for optimizing the location of seeds relative to the soil surface and relative to side banded fertilizers in changing soil conditions.

BACKGROUND

Trailing arm furrow opener assemblies are well known in the agricultural industry. These assemblies are spaced across the width of a seeding implement and each comprises a lengthy arm that is pivotally attached at the front end thereof to the implement frame about a horizontal pivot axis oriented perpendicular to the operating travel direction such that the arm can pivot up and down with respect to the frame. A packer wheel is mounted to a rear end of the arm and one or more furrow opener shanks extend downward from the arm forward of the packer wheel. A bias element such as a spring or hydraulic cylinder exerts a downward bias force on the arm to push the furrow opener mounted on the bottom of the shank into the soil to create a furrow, and the furrow depth is set by the relative positions of the packer wheel and furrow opener.

Such a trailing arm furrow opener assembly with a single furrow opener is disclosed in U.S. Pat. No. 7,159,523 to Bourgault et al. for depositing a single product in a single furrow. In many crops it is desirable to place at least some fertilizer closely adjacent to the seed so that the nutrients are available as soon as the seeds germinate and the plant begins to grow. In such a single furrow opener assembly it is common to dispense both seed and fertilizer into the same delivery conduit to form a mixed product and direct the mixed product into the single furrow.

U.S. Pat. No. 5,396,851 to Beaujot and U.S. Pat. No. 7,261,048 to Hantke disclose such an assembly with a trailing arm and packer wheel with front and rear furrow opener shanks attached to the trailing arm to deposit two products into two separate furrows. In the Beaujot apparatus, knife type furrow openers are attached to the bottom ends of the shanks to make two slightly laterally spaced furrows, one for seeds and the other for fertilizer, commonly granular fertilizer. U.S. Pat. No. 5,609,114 to Barton discloses a similar trailing arm with front and rear disc type furrow openers mounted to the arm.

These arrangements with two furrow openers typically place side-banded fertilizer in a fertilizer furrow made by the front furrow opener and seed in a seed furrow made by the rear furrow opener. It is generally desirable to place the seed in the furrow made by the rear furrow opener to avoid disturbing the seed once it is placed. Placement of the seed at a suitable depth is important to ensure germination and early emergence. The placement of the fertilizer is not as critical but it is important to maintain a safe separation distance between the seeds and fertilizer to avoid damage to the seeds that can be caused by the fertilizer.

This safe separation distance varies with numerous factors, especially the particular crop being seeded, and the particular fertilizer being used and the rate of fertilizer application. Fertilizers are essentially salts, and can adversely affect the ability of the seedling to absorb water and seedling desiccation can occur. Different fertilizers have different salt indexes or burn potential than others. Thus the type of fertilizer and rate of fertilizer application affects the safe separation distance, with lower rates allowing lower separation distances. Different fertilizers also move through the soil at different rates. Phosphate fertilizers move slower and so it is desirable to place these nearer to the seed, while nitrogen fertilizers move more readily and may be placed farther away without reducing their effectiveness.

Soil conditions that tend to concentrate salts, or stress the germinating seed, increase the potential for damage. So, the safe separation distance for a given rate of application of side-banded fertilization is increased with sandier soil texture and in drier soil conditions. Clay soils and soils with higher organic matter content hold onto moisture and moist soil can allow higher rates at the same separation distance, or the same rate with a lower separation distance. Also other environmental conditions that induce stress and slow germination, such as cold temperatures, can increase the likelihood of damage and so increase the safe separation distance.

The furrow openers are typically arranged such that the fertilizer furrow is somewhat deeper than the seed furrow and laterally spaced from the seed furrow. The depth of the seed and fertilizer furrows can be adjusted independently to suit various crops and fertilizer rates. In the arrangement shown by Hantke, both furrow opener shanks are adjustably fixed to the rear link of a parallel link trailing arm such that as the implement frame moves up and down with respect to the soil surface in rolling terrain, the seed and fertilizer furrows are maintained at a constant depth, and the separation distance between the seed and fertilizer is maintained constant as well. Each of the front and rear shanks is adjustable with respect to the rear link to independently change the depth of each of the seed and fertilizer furrows, and also the separation distance.

The arrangement of Hantke overcomes the problem of furrow depth variances when operating in rolling terrain. In the above furrow opener assemblies with a single trailing arm where the front and rear furrow opener shanks are attached to the trailing arm between the packer wheel and the pivotal connection to the frame, the frame height above the ground is fixed however the depth of each furrow will still vary significantly as the frame tilts when passing over rolling terrain and the actual height above the ground of each lateral frame member, to which the trailing arms are attached, varies.

Since the rear end of the trailing arm is maintained at a constant height by the packer wheel, as the front end of the trailing arm moves up and down with the frame in rolling terrain, the front furrow opener moves up and down to greater degree than the rear furrow opener, and so the separation distance between the seed and fertilizer also varies. It can also be seen that it is desirable to place the more depth sensitive seed furrow opener nearest to the packer wheel where variations are reduced, and the less depth sensitive fertilizer furrow opener ahead of the seed furrow opener. These variations are schematically illustrated in FIG. 6 of the Hantke U.S. Pat. No. 7,261,048.

U.S. Pat. No. 8,909,436 to Achen et al. discloses a system for sensing a variety of soil characteristics which are changing as the seeder moves across a field, and adjusting the depth of the seed furrow in response to sensed characteristics of the soil such as soil temperature, moisture content of soil, and soil type.

SUMMARY OF THE INVENTION

The present disclosure provides a seeding and fertilizing method that overcomes problems in the prior art. Generally it is advantageous to place the fertilizer as close to the seeds as possible for any particular combination of crop types, fertilizer type, and fertilizer rate. While maintaining a safe separation distance between the seed and side-banded fertilizer is important to prevent seed damage, the safe separation distance will vary with soil conditions and also to some extent with temperature, as cold temperatures also stress the seeds.

The present disclosure provides a method for reducing the separation distance and the depth of separate seed and fertilizer furrows while passing through portions of the field surface where conditions are favorable while increasing the separation distance and the depth of separate seed and fertilizer furrows while passing through portions of the field surface where conditions are less favorable.

As a particular example the present disclosure addresses the soil moisture conditions which are present in various parts of the field, and which are of significant importance when determining whether or not favorable soil conditions are present. Where the soil is moist, the safe separation distance is reduced and the present disclosure takes advantage of this by moving the fertilizer closer to the seed where same is more readily available. At the same time the present disclosure reduces seed depth in favorable soil conditions to facilitate early emergence.

As the seeding implement moves into a less favorable soil condition in an adjacent field portion the separation distance and seed depth are increased by moving the seed furrow opener downward, and by moving the fertilizer furrow opener downward to a greater degree than the seed furrow opener. In particular the adjacent field surface may be drier, with the moisture level located deeper and so the seeds are moved downward to reach the moisture in the soil, and the separation distance is simultaneously increased to provide a safety margin to reduce seed damage in the less favorable conditions where the seeds are under increased stress.

A further benefit of moving the fertilizer furrow opener deeper than the seed furrow opener is that moist soil from deeper in the soil surface is lifted by the fertilizer furrow opener and mixed with the drier soil above to improve soil moisture conditions in the seed furrow.

The present disclosure provides a method of improving crop yields by optimizing seed depth and a separation distance between seeds and fertilizer during planting into a field surface as soil conditions change from a negative soil condition that is present in a plurality of negative field portions of the field surface, to a transitional soil condition that is present in a transitional field portion of the field surface, and to a positive soil condition that is present in a plurality of positive field portions of the field surface, such that the transitional field portion lies between each of the negative and positive field portions and such that passing along the field surface from one of the negative field portions to one of the positive field portions or to a different one of the negative field portions requires passing through the transitional field portion. The method comprises attaching a seed furrow opener and a fertilizer furrow opener to an implement frame of a seeding implement and moving the implement frame across the field surface such that the seed furrow opener engages the field surface above and rearward of the fertilizer furrow opener; dispensing crop seeds into a seed furrow formed in the field surface by the seed furrow opener and dispensing fertilizer into a fertilizer furrow formed in the field surface by the fertilizer furrow opener such that the seed and fertilizer are separated by a separation distance; moving the implement frame along one of the negative field portions with the seed furrow opener engaging the field surface at a negative seed depth and the fertilizer furrow opener engaging the field surface at a negative fertilizer depth that is greater than the negative seed depth to provide a negative separation distance; moving the implement frame from the negative field portion into the transitional field portion with the seed furrow opener engaging the field surface at a transitional seed depth that is less than the negative seed depth and the fertilizer furrow opener engaging the field surface at a transitional fertilizer depth that is less than the negative fertilizer depth and greater than the transitional seed depth to provide a transitional separation distance that is less than the negative separation distance; moving the implement frame from the transitional field portion into one of the positive field portions with the seed furrow opener engaging the field surface at a positive seed depth that is less than the transitional seed depth and the fertilizer furrow opener engaging the field surface at a positive fertilizer depth that is less than the transitional fertilizer depth and greater than the positive seed depth to provide a positive separation distance that is less than the transitional separation distance.

The present disclosure thus provides a method of varying seed and fertilizer depth, and the separation distance between the seed and fertilizer to suit varying conditions that occur in a field surface.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Soil conditions present in field surfaces vary from one geographic area to another, but also in many agricultural areas such soil conditions vary significantly within a single field. Adverse or negative conditions, for example a dry soil condition, may be present in some field portions while favorable or positive conditions, such as a moist soil condition, are present in other areas of the same field. A transition area lies between the negative and positive field portions, for example as the soil moisture level increases from an adverse level as one moves out of the negative field portion to a favorable level when reaching the positive field portion. Other soil conditions such as organic content, particulate size, and the like can also cause favorable or adverse conditions for crop growth.

Crops such as canola, wheat, peas, and the like each have their own characteristics such as desirable seeding depth, fertilizer requirements, sensitivity to fertilizer damage and the like, and such adjustments may be necessary to address changes in the crop being seeded.

Figure 1:
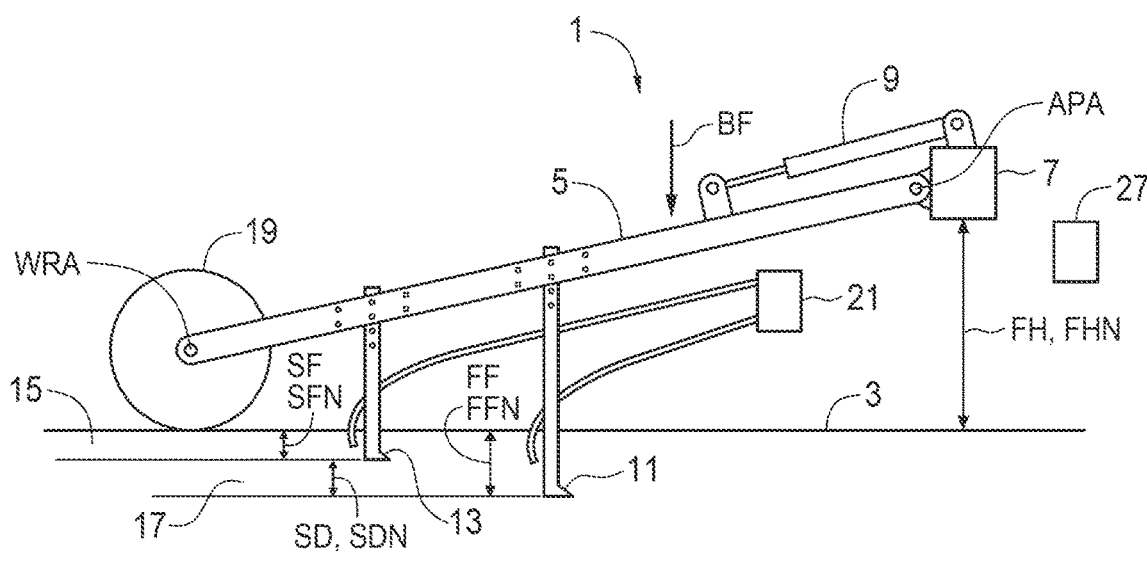
FIG. 1 is a schematic side view of an embodiment of the seeding apparatus of the present disclosure shown in a negative configuration.
Figure 2:
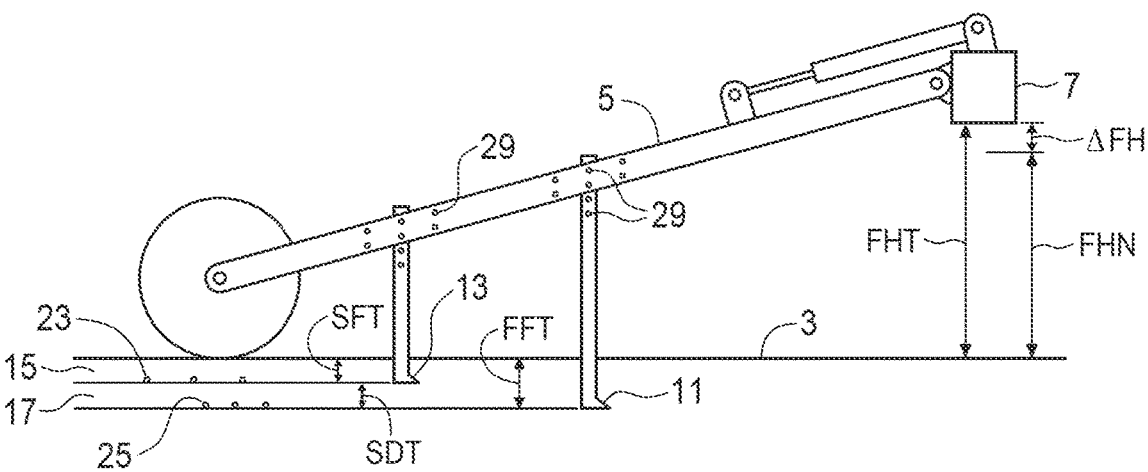
FIG. 2 is a schematic side view of the embodiment of FIG. 1 shown in a transitional configuration.
Figure 3:
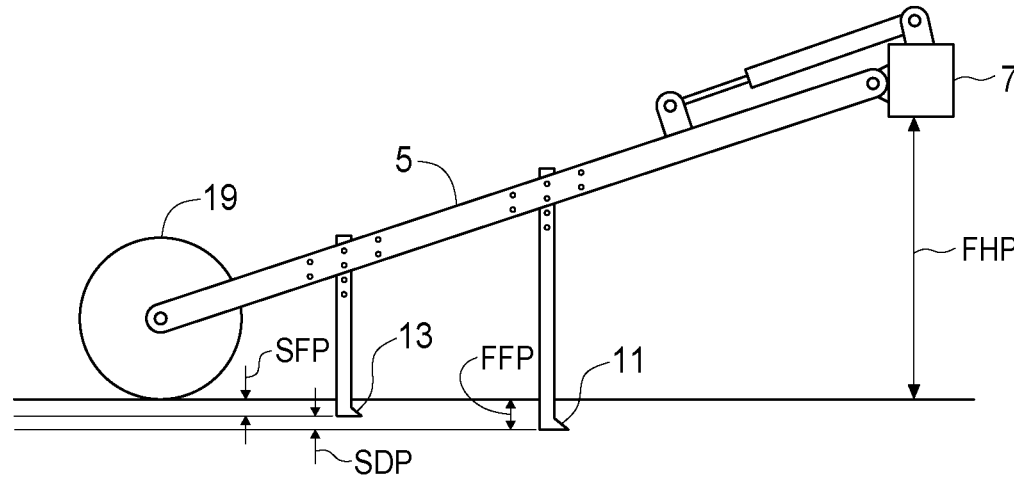
FIG. 3 is a schematic side view of the embodiment of FIG. 1 shown in a positive configuration.
Figure 4:
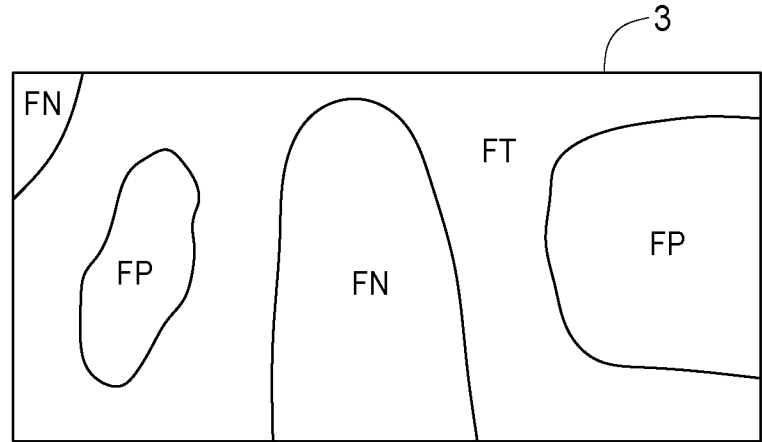
FIG. 4 is a schematic top view of a field surface showing negative, positive, and transitional field portions with corresponding soil conditions.

FIGS. 1-3 schematically illustrate an embodiment of a seeding apparatus 1 of the present disclosure for practicing the present method of optimizing seed depth and a separation distance SD between seeds and fertilizer as soil conditions change in a field surface 3 such as schematically illustrated in FIG. 4 where a negative soil condition is present in a plurality of negative field portions FN of the field surface 3, a positive soil condition is present in a plurality of positive field portions FP of the field surface, and a transitional soil condition is present in a transitional field portion FT of the field surface lying between the negative and positive field portions FN, FP such that passing along the field surface 3 from one of the negative field portions FN to one of the positive field portions FP requires passing through the transitional field portion FT. Passing from any one of the negative or positive field portions FN, FP to any other one of the negative or positive field portions FN, FP requires passing through the transitional field portion FT.

The apparatus 1 comprises an arm member provided by a trailing arm 5 that is pivotally attached at a front end of the trailing arm to an implement frame 7 about an arm pivot axis APA and a bias element 9 operative to exert a downward bias BF force on the trailing arm 5. A fertilizer furrow opener 11 is attached to the trailing arm and a seed furrow opener 13 is attached to the trailing arm above and rearward of the fertilizer furrow opener 11 such that a seed furrow 15 formed by the seed furrow opener 13 has a seed furrow depth SF less than a fertilizer furrow depth FF of a fertilizer furrow 17 formed by the fertilizer furrow opener 11. It is also common for the seed furrow 15 to be laterally offset a small distance from the fertilizer furrow 17.

A packer wheel 19 is rotatably attached to a rear end of the trailing arm 5 assembly about a wheel rotational axis WRA, and a distribution system 21 is operative to dispense crop seeds 23 into the seed furrow 15 and fertilizer 25 into the fertilizer furrow 17 such that the seed and fertilizer are separated by a separation distance SD.

A furrow controller 27 is operative to change the relative positions of the seed furrow opener 13, the fertilizer furrow opener 11, and the packer wheel 19 as the implement frame 7 moves over the field surface 3 from a negative configuration shown in FIG. 1 for operations in the negative field portions FN, to a transitional configuration shown in FIG. 2 for operations in the transitional field portion FT, and to a positive configuration shown in FIG. 3 for operations in the positive field portions FP.

In the illustrated apparatus 1 the furrow controller 27 is operative to move the implement frame 7 upward and downward with respect to the field surface 3 to change the frame height FH. Thus in a negative configuration the implement frame 7 is supported at a frame height FHN as shown in FIG. 1. The implement frame 7 is raised to the frame height FHT shown in FIG. 2 to the transitional configuration and the implement frame 7 is moved upward again to a frame height FHP to change from the transitional configuration to the positive configuration. In a typical seeding implement of this type the wheels (not shown) supporting the implement frame 7 move up and down with respect to the implement frame to correspondingly move the implement frame 7 down and up with respect to the field surface 3.

It can be seen that as the implement frame 7 moves upward while the packer wheel 19 remains on the ground, the seed and fertilizer furrow openers 13, 11 move upward with respect to the field surface so that the depth of the seed and fertilizer furrows 17 is reduced. It can also be seen from the geometry of the illustrations that the fertilizer furrow opener 11 moves upward proportionately farther than the seed furrow opener 13. In the illustrated apparatus 1, the fertilizer furrow opener 11 is midway between the arm pivot axis APA and the wheel rotational axis WRA, with the result that as the implement frame moves upward by a distance FHT minus FHN=ΔFH from the position of FIG. 1 to the position of FIG. 2, the fertilizer furrow opener 11 moves up by only one half that distance ΔFH.

Similarly the seed furrow opener 13 is midway between the fertilizer furrow opener 11 and the wheel rotational axis WRA, with the result that as the implement frame moves upward by a distance ΔFH, and the fertilizer furrow opener 11 moves up by one half the distance ΔFH, the seed furrow opener 13 moves up by only one half the distance that the fertilizer furrow opener 11 moves up. Thus for example when the implement frame moves upward 4 inches, the fertilizer furrow opener moves up 2 inches, and the seed furrow opener moves up 1 inch. This proportional difference in vertical movement of the seed and fertilizer furrow openers 13, 11 as the frame height FH changes means that the separation distance SD between the seeds 23 in the seed furrow 15 and the fertilizer 25 in the fertilizer furrow 17 changes as well, decreasing as the implement frame and furrow openers move upward, and increasing as the implement frame and furrow openers move downward.

The present disclosure takes advantage of this relationship by moving the seeds closer to the surface for early emergence and at the same time moving the fertilizer closer to the seeds where conditions are favorable, and moving the seeds farther into the field surface while moving the fertilizer farther from the seeds where conditions are less favorable. While other soil conditions may be addressed the present disclosure is particularly well suited to addressing soil conditions that change from a negative dry condition, where the soil is dry on the surface through a transition area to soil in a positive moist condition near the surface.

The furrow controller 27 is operated to attain, when moving over one of the negative field portions FN, the negative furrow configuration of FIG. 1 where the seed furrow opener 13 engages the field surface 3 at a negative seed furrow depth SFN and the fertilizer furrow opener 11 engages the field surface at a negative fertilizer furrow depth FFN that is greater than the negative seed furrow depth SFN to provide a negative separation distance SDN.

When moving over the transitional field portion FT, the furrow controller 27 is operated to attain the transitional furrow configuration of FIG. 2 where the seed furrow opener 13 engages the field surface at a transitional seed furrow depth SFT that is less than the negative seed furrow depth SFN and the fertilizer furrow opener 11 engages the field surface at a transitional fertilizer furrow depth FFT that is less than the negative fertilizer furrow depth FFN and greater than the transitional seed furrow depth SFT to provide a transitional separation distance SDT that is less than the negative separation distance SDN.

Then when moving over one of the positive field portions FP, the furrow controller 27 is operated to attain the positive furrow configuration of FIG. 3 where the seed furrow opener 13 engages the field surface at a positive seed furrow depth SFP that is less than the transitional seed furrow depth SFT and the fertilizer furrow opener 11 engages the field surface at a positive fertilizer furrow depth FFP that is less than the transitional fertilizer furrow depth FFT and greater than the positive seed furrow depth SFP to provide a positive separation distance SDP that is less than the transitional separation distance SDT.

In the illustrated apparatus 1 the seed furrow opener 13 and the fertilizer furrow opener 11 are releasably attached to the trailing arm 5 by fasteners through corresponding holes 29 such that the furrow depths and separation distance SD can be adjusted by changing the vertical distance between the trailing arm 5 and the seed and fertilizer furrow openers 13, 11.

The separation distance SD is also adjustable by changing locations of the seed and fertilizer furrow openers 11, 13 along a length of the trailing arm 5. For example the difference between the negative separation distance SDN and the transitional separation distance SDT can be increased by increasing a distance between the locations of the seed and fertilizer furrow openers 13, 11 on the length of the trailing arm 5, and the difference between the negative separation distance SDN and the transitional separation distance SDT can be decreased by decreasing the distance between the locations of the seed and fertilizer furrow openers 13, 11 on the length of the trailing arm 5.

In some seeding situations where the field surface has consistent and uniform soil conditions it may be that the seeding apparatus 1 will be operated over the whole of the field surface at a corresponding one of the configurations. When moving to a different field surface also with consistent and uniform soil conditions but which are different soil conditions, the seeding apparatus can be moved to a different configuration.

Typically any adjustments such as setting minimum/ maximum seed furrow depth, minimum/maximum separation distance, and the like for a particular crop are made when beginning to seed that crop, and then changes to suit soil conditions are made with the furrow controller 27.

Figure 5:
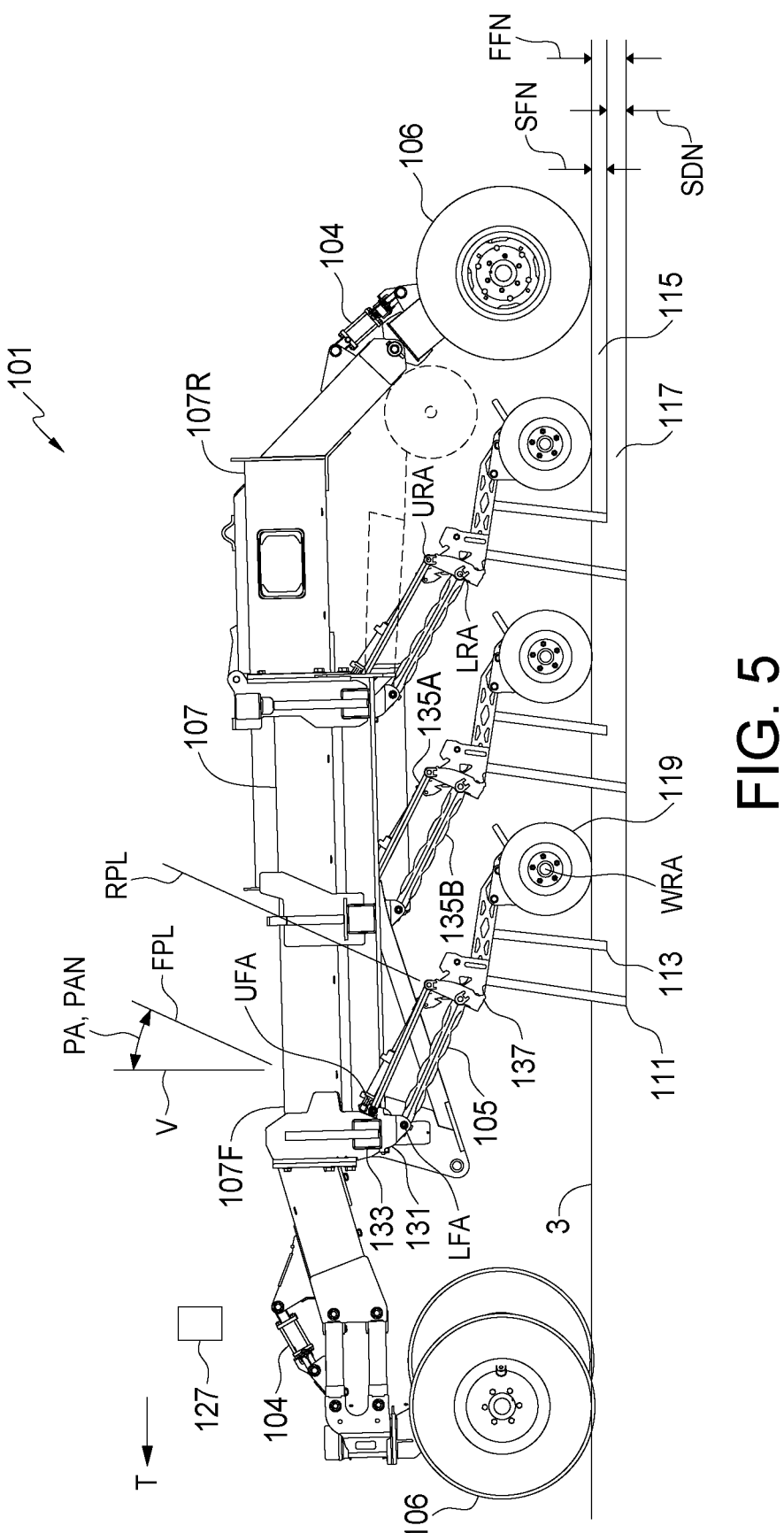
FIG. 5 is a schematic side view of an alternate embodiment of the seeding apparatus of the present disclosure shown in a negative configuration.
Figure 6:
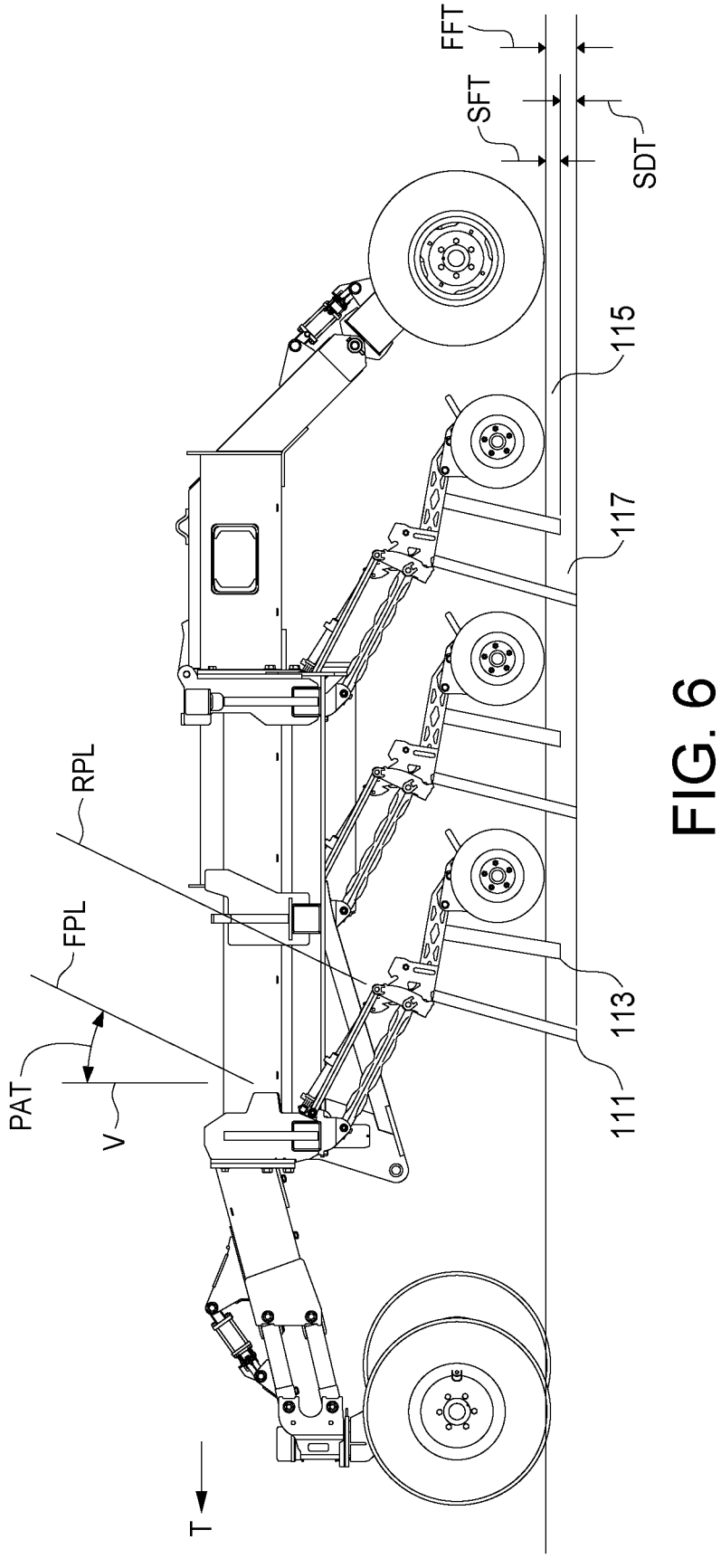
FIG. 6 is a schematic side view of the embodiment of FIG. 5 shown in a transitional configuration.
Figure 7:
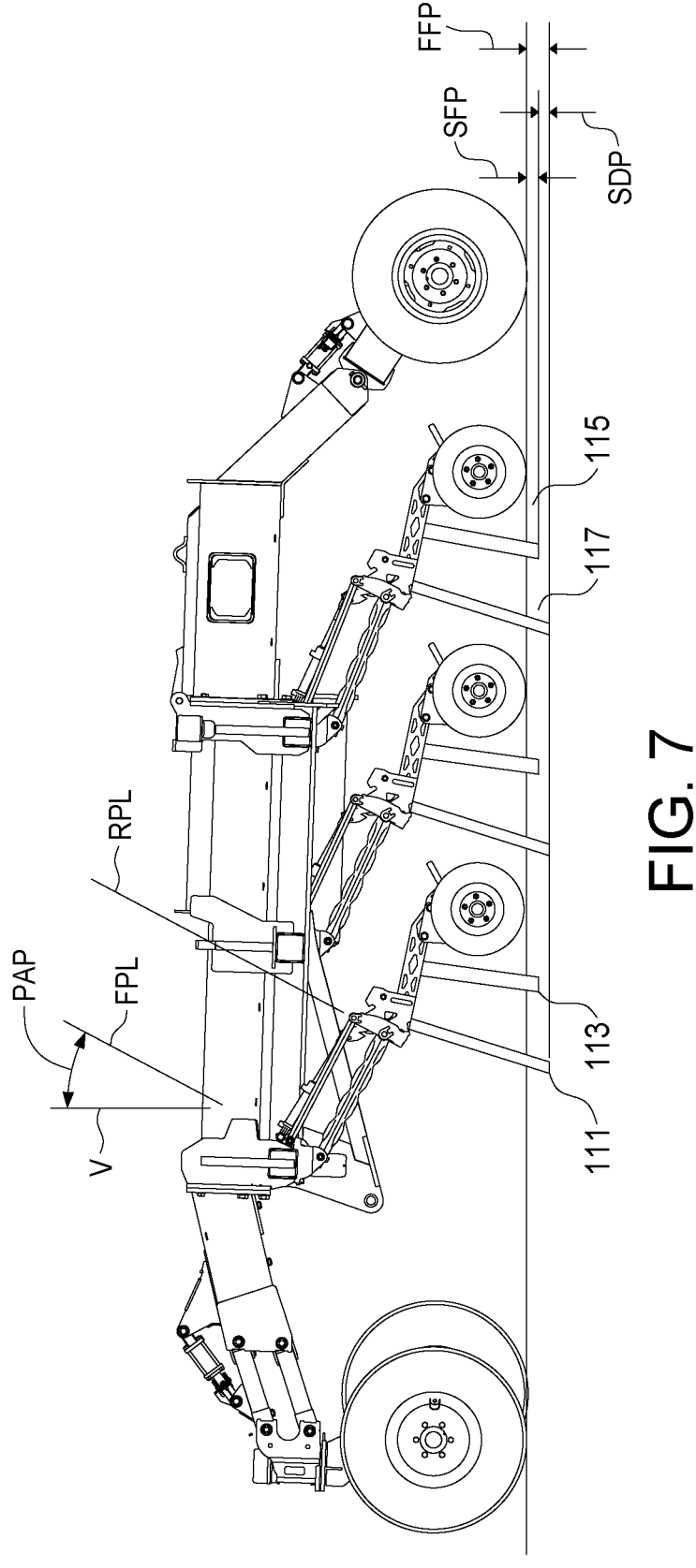
FIG. 7 is a schematic side view of the embodiment of FIG. 5 shown in a positive configuration.

FIGS. 5-7 illustrate an alternate embodiment of the seeding apparatus 101 of the present disclosure for optimizing seed depth and a separation distance SD between seeds and fertilizer as soil conditions change in a field surface 3. In the apparatus 101 the trailing arm assembly 105 comprises a parallel link trailing arm assembly comprising a front link member 131 fixed to a lateral frame member 133 of the implement frame 107, and upper and lower parallel arm members 135A, 135B pivotally attached at front ends thereof to the front link member about corresponding upper and lower front pivot axes UFA, LFA oriented substantially horizontally and perpendicular to an operating travel direction T, and pivotally attached at rear ends thereof to a rear link member 137 about corresponding upper and lower rear pivot axes URA, LRA oriented substantially parallel to the front pivot axes UFA, LFA such that the parallel arm members are parallel to each other.

In the trailing arm assembly 105 a front pivot line FPL connecting the upper and lower front pivot axes UFA, LFA is parallel to a rear pivot line RPL connecting the upper and lower rear pivot axes URA, LRA, and the front and rear pivot lines FPL, RPL are oriented at an adjustable pivot angle PA with respect to a vertical orientation V. The seed furrow opener 113, the fertilizer furrow opener 111, and the wheel rotational axis WRA are attached to the rear link rearward of the rear pivot line RPL such that the seed furrow opener 113, the fertilizer furrow opener 111, and the packer wheel 119 are fixed with respect to the rear link 137 during operation. The seed furrow openers 113 engage the field surface 3 to form seed furrows 115 and the fertilizer furrow openers 111 engage the field surface 3 to form fertilizer furrows 117.

In the apparatus 101, the furrow controller 127, typically comprising hydraulic power from the towing vehicle and hydraulic cylinders 104 connected to raise and lower the implement wheels 106, is operative to change the relative positions of the seed furrow opener 113, the fertilizer furrow opener 111, and the packer wheel 119 as the implement frame 107 moves over the field surface 3 by adjusting the pivot angle PA. In the apparatus 101 the furrow controller 127 adjusts the pivot angle PA with respect to the vertical orientation V by changing a vertical position of a front end 107F of the implement frame 107 with respect to a vertical position a rear end 107R of the implement frame 107. This change is accomplished with the furrow controller 127, typically a hydraulic control on the towing tractor, by extending or retracting the hydraulic cylinders 104 to move the wheels 106 up and down.

In the negative configuration shown in FIG. 5, where the seed furrow opener 113 engages the field surface 3 at a negative seed furrow depth SFN and the fertilizer furrow opener 111 engages the field surface at a negative fertilizer furrow depth FFN that is greater than the negative seed furrow depth SFN to provide a negative separation distance SDN, the front end 107F of the implement frame 107 is lower than the rear end 107R of the implement frame 107 and the pivot angle PA is oriented at a negative pivot angle PAN with respect to the vertical orientation V.

To move to the transitional configuration of FIG. 6 from the negative configuration of FIG. 5, the furrow controller tilts the pivot line PLF rearward by moving the front end of the implement frame 107F upward with respect to the rear end 107R so the pivot line FPL moves from the negative pivot angle PAN to a transitional pivot angle PAT that is greater than the negative pivot angle PAN. As described above with respect to the apparatus 1, in the transitional configuration the seed furrow opener 113 engages the field surface at a transitional seed furrow depth SFT that is less than the negative seed furrow depth SFN and the fertilizer furrow opener 111 engages the field surface at a transitional fertilizer furrow depth FFT that is less than the negative fertilizer furrow depth FFN and greater than the transitional seed furrow depth SFT to provide a transitional separation distance SDT that is less than the negative separation distance SDN.

To move to the positive configuration of FIG. 7 from the transitional configuration of FIG. 6, the furrow controller tilts the pivot line FPL further rearward by moving the front end of the implement frame 107F further upward with respect to the rear end 107R so the pivot line FPL moves from the transitional pivot angle PAT to a positive pivot angle PAP that is greater than the transitional pivot angle PAT. As described above with respect to the apparatus 1, in the positive furrow configuration of FIG. 7 the seed furrow opener 113 engages the field surface at a positive seed furrow depth SFP that is less than the transitional seed furrow depth SFT and the fertilizer furrow opener 111 engages the field surface at a positive fertilizer furrow depth FFP that is less than the transitional fertilizer furrow depth FFT and greater than the positive seed furrow depth SFP to provide a positive separation distance SDP that is less than the transitional separation distance SDT.

Figures 8, 9:
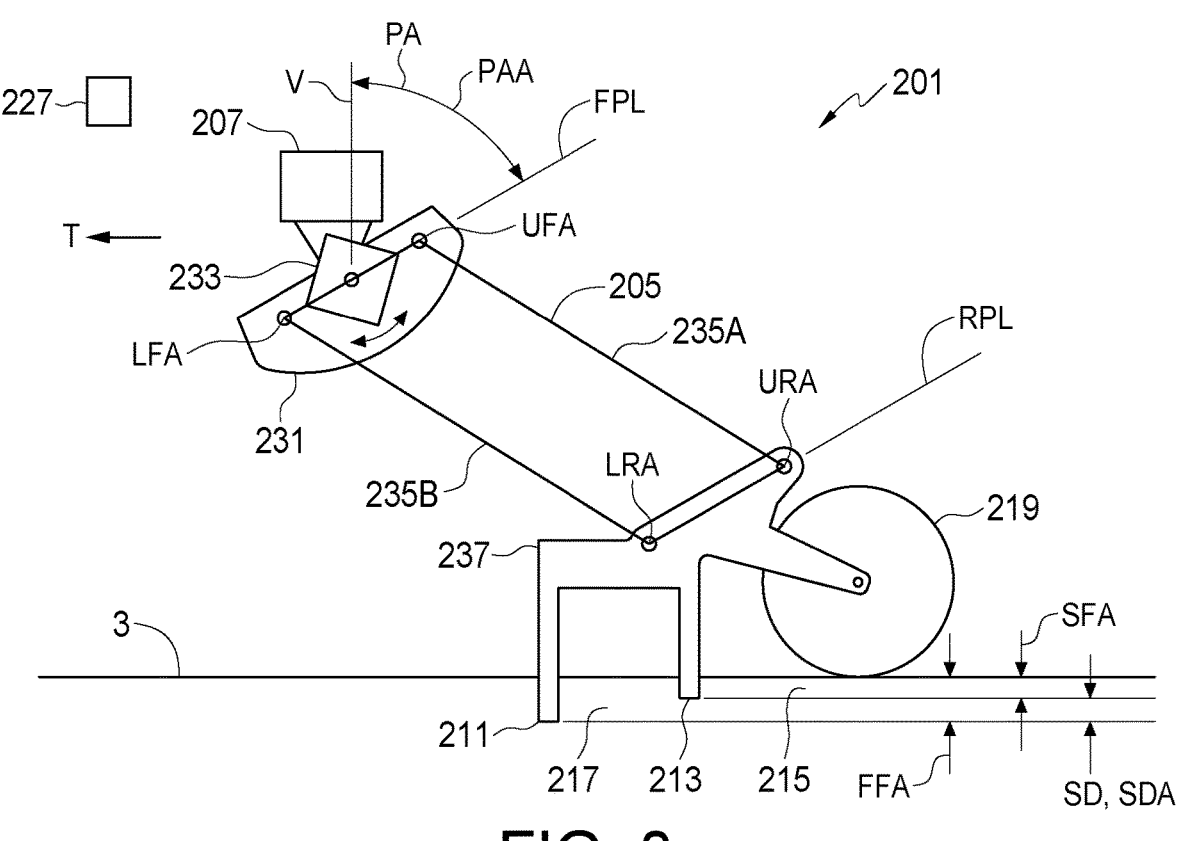
FIG. 8 is a schematic side view of a further alternate embodiment of the seeding apparatus of the present disclosure shown in a first configuration.
FIG. 9 is a schematic side view of the embodiment of FIG. 8 shown in a second configuration where the seed furrow, fertilizer furrow, and separation distance between the seed and fertilizer is increased.

FIGS. 8 and 9 schematically illustrate a further alternate embodiment of the seeding apparatus 201 of the present disclosure for optimizing seed depth and a separation distance SD between seeds and fertilizer as soil conditions change in a field surface 3. In the apparatus 201 the trailing arm assembly 205 again comprises a parallel link trailing arm assembly 205 comprising a front link member 231 fixed to a lateral frame member 233 of the implement frame 207, and upper and lower parallel arm members 235A, 235B pivotally attached at front ends thereof to the front link member about corresponding upper and lower front pivot axes UFA, LFA oriented substantially horizontally and perpendicular to an operating travel direction T, and pivotally attached at rear ends thereof to a rear link member 237 about corresponding upper and lower rear pivot axes URA, LRA oriented substantially parallel to the front pivot axes UFA, LFA such that the parallel arm members are parallel to each other.

In the trailing arm assembly 205 the front pivot line FPL connecting the upper and lower front pivot axes UFA, LFA is parallel to the rear pivot line RPL connecting the upper and lower rear pivot axes URA, LRA, and the front and rear pivot lines FPL, RPL are oriented at an adjustable pivot angle PA with respect to a vertical orientation V. The seed furrow opener 213, the fertilizer furrow opener 211, and the packer wheel 219 are attached to the rear link such that the seed furrow opener 213, the fertilizer furrow opener 211, and the packer wheel 219 are fixed with respect to the rear link 237 during operation. The seed furrow opener 213 engages the field surface 3 to form seed furrow 215 and the fertilizer furrow opener 211 engages the field surface 3 to form fertilizer furrow 217.

As in the apparatus 101 described above, the furrow controller 227 is operative to change the relative positions of the seed furrow opener 213, the fertilizer furrow opener 211, and the packer wheel 219 as the implement frame 207 moves over the field surface 3 by adjusting the pivot angle PA. However in contrast to the apparatus 101, here the lateral frame member 233 is rotatably attached to the implement frame 207 about a frame rotational axis FRA oriented substantially horizontally and perpendicular to the operating travel direction T and the furrow controller 227 adjusts the pivot angle PA with respect to the vertical orientation V by rotating the lateral frame member 233.

FIG. 8 shows the apparatus 201 in a first configuration with the pivot angle PA oriented at a first pivot angle PAA and where the seed furrow opener 213 engages the field surface 3 at a first seed furrow depth SFA and the fertilizer furrow opener 211 engages the field surface at a first fertilizer furrow depth FFA to provide a first separation distance SDA.

FIG. 9 shows the apparatus 201 in a second configuration where the seed furrow opener 213 engages the field surface 3 at a second seed furrow depth SFB that is greater than the first seed furrow depth SFA and the fertilizer furrow opener 211 engages the field surface at a second fertilizer furrow depth FFB that is greater than the first fertilizer furrow depth FFA and greater than the second seed furrow depth SFB to provide a second separation distance SDB that is less than the first separation distance SDA.

Also in contrast to the apparatus 101 described above, the seed furrow opener 213 and the wheel rotational axis WRA are attached to the rear link rearward of the rear pivot line RPL, and the fertilizer furrow opener 211 is attached to the rear link member 237 forward of the rear pivot line RPL. Placing the fertilizer furrow opener 211 forward of the rear pivot line RPL compared to rearward of the rear pivot line provides a different proportional relative movement of the furrow openers 211, 213 that may be advantageous in some applications.

The present disclosure further provides a method of improving crop yields by optimizing seed depth and a separation distance between seeds 23 and fertilizer 25 during planting into a field surface 3 as soil conditions change from a negative soil condition that is present in a plurality of negative field portions FN of the field surface, to a transitional soil condition that is present in a transitional field portion FT of the field surface, and to a positive soil condition that is present in a plurality of positive field portions FP of the field surface, such that the transitional field portion FT lies between each of the negative and positive field portions FN, FP and such that passing along the field surface 3 from one of the negative field portions FN to one of the positive field portions FP or to a different one of the negative field portions FN requires passing through the transitional field portion FT.

The method comprises attaching a seed furrow opener 13 and a fertilizer furrow opener 11 to an implement frame 7 of a seeding implement and moving the implement frame 7 across the field surface 3 such that the seed furrow opener 13 engages the field surface 3 above and rearward of the fertilizer furrow opener 11; dispensing crop seeds 23 into a seed furrow 15 formed in the field surface 3 by the seed furrow opener 13 and dispensing fertilizer 25 into a fertilizer furrow 17 formed in the field surface 3 by the fertilizer furrow opener 11 such that the seed and fertilizer are separated by a separation distance SD; moving the implement frame 7 along one of the negative field portions FN with the seed furrow opener 13 engaging the field surface at a negative seed depth SFN and the fertilizer furrow opener engaging the field surface at a negative fertilizer depth FFN that is greater than the negative seed depth SFN to provide a negative separation distance SDN; moving the implement frame from the negative field portion FN into the transitional field portion FT with the seed furrow opener 13 engaging the field surface 3 at a transitional seed depth SFT that is less than the negative seed depth SFN and the fertilizer furrow opener 11 engaging the field surface 3 at a transitional fertilizer depth FFT that is less than the negative fertilizer depth FFN and greater than the transitional seed depth SFT to provide a transitional separation distance SDT that is less than the negative separation distance SDN; moving the implement frame 7 from the transitional field portion FT into one of the positive field portions FP with the seed furrow opener 13 engaging the field surface 3 at a positive seed depth SFP that is less than the transitional seed depth SFT and the fertilizer furrow opener 11 engaging the field surface 3 at a positive fertilizer depth FFP that is less than the transitional fertilizer depth FFT and greater than the positive seed depth SFP to provide a positive separation distance SDP that is less than the transitional separation distance SDT.

The method can be practiced using, for example, one of the seeding apparatuses 1, 101, 201 described above. In one application of the disclosed method an operator, when moving the implement frame 7 along one of the negative field portions FN toward the transitional field portion FT, visually determines the boundary between the negative field portion FN and the transitional field portion FT and, using for example a hydraulic control on the tractor towing the implement, manually adjusts the seed depth, fertilizer depth and separation distance for movement along the transitional field portion, and when moving the implement frame 7 along the transitional field portion FT, visually determines a boundary between the transitional field portion FT and an approaching one of the positive field portions FP and manually adjusts the seed depth, fertilizer depth and separation distance for movement along the positive field portion FP.

Another application of the disclosed method comprises topographically mapping vertical differences in the field surface 3 to divide the field surface into high areas between an upward slope US followed by a transition to a downward slope DS corresponding to the negative field portions FN, low areas between a downward slope DS followed by a transition to an upward slope US corresponding to the positive field portions FP, and a transitional area lying between the high and low areas and corresponding to the transitional field portion FT, and tracking movement of the implement frame 7 along the field surface 7 and automatically adjusting the seed depth, fertilizer depth and separation distance to suit an approaching negative, transitional, or positive field portion.

Figure 10:
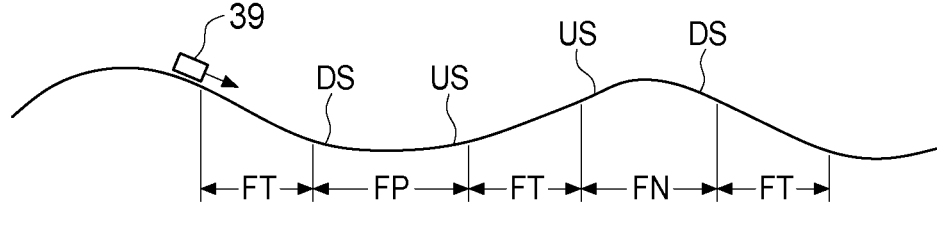
FIG. 10 is a schematic sectional side view of a field with an inclinometer moving over the field surface to determine negative, transitional, and positive field portions of the field surface.

A further application of the disclosed method comprises mapping slopes of the field surface 3 with an inclinometer 39 as schematically illustrated in FIG. 10. and defining the negative field portions FN as those areas between an upward slope US followed by a transition to a downward slope DS, and defining the positive field portions FP as those areas between a downward slope DS followed by a transition to an upward slope US, and defining the transitional field portion FT as everything that is not one of the negative or positive field portions FN, FP.

The negative soil condition for example can be a dry soil condition with the positive soil condition a moist soil condition with the transitional soil condition between the dry and moist soil conditions. Alternatively the negative soil condition could be a sandy soil condition with the positive soil condition a clay soil condition with the transitional soil condition having gradations of particulates between the sandy and clay soil conditions.

The present disclosure thus provides a method of varying seed and fertilizer depth, and the separation distance between the seed and fertilizer to suit varying conditions that occur in a field surface, and various apparatuses for practicing the method are provided as well.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method of improving crop yields by optimizing seed depth and a separation distance between seeds and fertilizer during planting into a field surface as soil conditions change from a negative soil condition that is present in a plurality of negative field portions of the field surface, to a transitional soil condition that is present in a transitional field portion of the field surface, and to a positive soil condition that is present in a plurality of positive field portions of the field surface, such that the transitional field portion lies between each of the negative and positive field portions and such that passing along the field surface from one of the negative field portions to one of the positive field portions or to a different one of the negative field portions requires passing through the transitional field portion, the method comprising:

attaching a seed furrow opener and a fertilizer furrow opener to an arm member that is movably attached to an implement frame of a seeding implement such that movement of the arm member causes movement of both the fertilizer furrow opener and the seed furrow opener, and such that the seed furrow opener engages the field surface above and rearward of the fertilizer furrow opener;

dispensing crop seeds into a seed furrow formed in the field surface by the seed furrow opener and dispensing fertilizer into a fertilizer furrow formed in the field surface by the fertilizer furrow opener such that the seed and fertilizer are separated by a separation distance;

moving the implement frame along one of the negative field portions with the seed furrow opener engaging the field surface at a negative seed depth and the fertilizer furrow opener engaging the field surface at a negative fertilizer depth that is greater than the negative seed depth to provide a negative separation distance;

moving the implement frame from the negative field portion into the transitional field portion with the seed furrow opener engaging the field surface at a transitional seed depth that is less than the negative seed depth and the fertilizer furrow opener engaging the field surface at a transitional fertilizer depth that is less than the negative fertilizer depth and greater than the transitional seed depth to provide a transitional separation distance that is less than the negative separation distance;

moving the implement frame from the transitional field portion into one of the positive field portions with the seed furrow opener engaging the field surface at a positive seed depth that is less than the transitional seed depth and the fertilizer furrow opener engaging the field surface at a positive fertilizer depth that is less than the transitional fertilizer depth and greater than the positive seed depth to provide a positive separation distance that is less than the transitional separation distance.

2. The method of claim 1 wherein the arm member is provided by a trailing arm, and comprising pivotally attaching a front end of the trailing arm to the implement frame about an arm pivot axis and rotatably attaching a packer wheel to a rear end of the trailing arm about a wheel rotational axis and attaching the seed furrow opener and the fertilizer furrow opener to the trailing arm such that the seed furrow opener and the fertilizer furrow opener extend down from the trailing arm and such that the seed furrow opener is above and rearward of the fertilizer furrow opener.

3. The method of claim 2 comprising:

configuring the trailing arm, fertilizer furrow opener, seed furrow opener and the packer wheel to provide a desired separation distance, fertilizer furrow depth, and seed furrow depth in each of the negative, positive, and transitional field portions as the implement frame moves up and down with respect to the field surface;

moving the implement frame along the negative field portions at a first frame height above the field surface, and changing the seed depth, fertilizer depth and separation distance by raising the implement frame to a transitional frame height when moving from one of the negative field portions to the transitional field portion;

moving the implement frame along the transitional field portion at the transitional frame height above the field surface, and changing the seed depth, fertilizer depth and separation distance by raising the implement frame to a second frame height when moving from the transitional field portion to one of the positive field portions, wherein the transitional frame height is higher than the first frame height and the second frame height is higher than the transitional frame height.

4. The method of claim 3 comprising varying the separation distance by adjusting locations of the seed and fertilizer furrow openers along a length of the trailing arm, or by adjusting a vertical distance between the trailing arm and at least one of the seed furrow opener and the fertilizer furrow opener.

5. The method of claim 4 comprising increasing proportional up and down movement of the fertilizer furrow opener relative to the up and down movement of the seed furrow opener by increasing a distance between the locations of the seed and fertilizer furrow openers on the length of the trailing arm, and decreasing the proportional up and down movement of the fertilizer furrow opener relative to the up and down movement of the seed furrow opener by decreasing the distance between the locations of the seed and fertilizer furrow openers on the length of the trailing arm.

6. The method of claim 2 comprising:

providing the trailing arm with a parallel link trailing arm assembly comprising a front link member fixed to a lateral frame member of the implement frame, and upper and lower parallel arm members pivotally attached at front ends thereof to the front link member about corresponding upper and lower front pivot axes oriented substantially horizontally and perpendicular to an operating travel direction, and pivotally attached at rear ends thereof to a rear link member about corresponding upper and lower rear pivot axes oriented substantially parallel to the front pivot axes such that the parallel arm members are parallel to each other;

wherein a front pivot line connecting the upper and lower front pivot axes is substantially parallel to a rear pivot line connecting the upper and lower rear pivot axes, and the front and rear pivot lines are oriented at an adjustable pivot angle with respect to a vertical orientation;

attaching the seed furrow opener, the fertilizer furrow opener, and the wheel rotational axis to the rear link member such that the seed furrow opener, the fertilizer furrow opener, and the packer wheel are fixed with respect to the rear link member during operation;

when moving the implement frame along one of the negative field portions, adjusting the pivot angle to a negative pivot angle;

when moving the implement frame along the transitional field portion, tilting the pivot line rearward to move the packer wheel downward to adjust the pivot angle to a transitional pivot angle; and when moving the implement frame along one of the positive field portions, tilting the pivot line further rearward to adjust the pivot angle to a positive pivot angle.

7. The method of claim 6 comprising:

adjusting the pivot angle by changing a vertical position of a front end of the implement frame with respect to a vertical position of a rear end of the implement frame; or adjusting the pivot angle by rotatably attaching the lateral frame member to the implement frame about a frame rotational axis oriented substantially horizontally and perpendicular to the operating travel direction, and rotating the lateral frame member.

8. The method of claim 1 comprising;

when moving the implement frame along one of the negative field portions toward the transitional field portion, visually determining a boundary between the negative field portion and the transitional field portion and manually adjusting the seed depth, fertilizer depth and separation distance for movement along the transitional field portion; and when moving the implement frame along the transitional field portion, visually determining a boundary between the transitional field portion and an approaching one of the positive field portions and manually adjusting the seed depth, fertilizer depth and separation distance for movement along the positive field portion.

9. The method of claim 1 comprising:

topographically mapping vertical differences in the field surface to divide the field surface into high areas between an upward slope followed by a transition to a downward slope corresponding to the negative field portions, low areas between a downward slope followed by a transition to an upward slope corresponding to the positive field portions, and a transitional area lying between the high and low areas and corresponding to the transitional field portion;

tracking movement of the implement frame along the field surface and automatically adjusting the seed depth, fertilizer depth and separation distance to suit an approaching negative, transitional, or positive field portion, wherein high areas have a higher elevation than lower areas.

10. The method of claim 1 comprising mapping slopes of the field surface with an inclinometer and defining the negative field portions as those areas between an upward slope followed by a transition to a downward slope, and defining the positive field portions as those areas between a downward slope followed by a transition to an upward slope, and defining the transitional field portion as everything that is not one of the negative or positive field portions.

11. The method of claim 1 wherein the negative soil condition is a first moisture level and the positive soil condition is a second moisture level and the transitional soil condition is a transitional moisture level between the first moisture level and second moisture level, and wherein the first moisture level is less than the transitional moisture level, and wherein the transitional moisture level is less than the second moisture level.

12. The method of claim 1 wherein the negative soil condition is a sandy soil condition and the positive soil condition is a clay soil condition and the transitional soil condition is a transitional soil condition between the sandy and clay soil conditions.

\* \* \* \* \*